United States Patent
Juds et al.

(10) Patent No.: US 6,377,167 B1
(45) Date of Patent: Apr. 23, 2002

(54) MULTI FREQUENCY PHOTOELECTRIC DETECTION SYSTEM

(75) Inventors: Scott Juds, Seattle; Paul Mathews, Langley, both of WA (US); Robert I Lewis, Sunnyvale, CA (US)

(73) Assignee: Auto-Sense LLC, Denver, CO (US)

( * ) Notice: Subject to any disclaimer, the term of this patent is extended or adjusted under 35 U.S.C. 154(b) by 0 days.

(21) Appl. No.: 09/674,215

(22) PCT Filed: Jul. 22, 1998

(86) PCT No.: PCT/US98/15053

§ 371 Date: May 1, 2001

§ 102(e) Date: May 1, 2001

(87) PCT Pub. No.: WO99/05661

PCT Pub. Date: Feb. 4, 1999

Related U.S. Application Data

(60) Provisional application No. 60/053,381, filed on Jul. 22, 1997.

(51) Int. Cl.$^7$ .................................................. B60Q 1/00
(52) U.S. Cl. ................... 340/435; 340/436; 340/903; 340/904; 340/933; 340/942; 340/943; 340/552; 340/556; 342/70
(58) Field of Search ............................... 340/435, 436, 340/903, 904, 933, 942, 943, 552, 555; 342/70

(56) References Cited

U.S. PATENT DOCUMENTS

| | | | | |
|---|---|---|---|---|
| 5,122,796 A | * | 6/1992 | Beggs et al. | 340/904 |
| 5,179,286 A | * | 1/1993 | Akasu | 280/561 |
| 5,194,906 A | * | 3/1993 | Kimura et al. | 356/5 |
| 5,239,353 A | * | 8/1993 | Ohmamyuda et al. | 356/5 |
| 5,339,075 A | | 8/1994 | Abst | |
| 5,724,141 A | * | 3/1998 | Nishino | 356/375 |
| 5,798,727 A | | 8/1998 | Shirai | |

* cited by examiner

Primary Examiner—Daniel J. Wu
Assistant Examiner—Tai T. Nguyen
(74) Attorney, Agent, or Firm—David A. Greenlee

(57) ABSTRACT

Collision avoidance apparatus (28, 30) is mounted on a host vehicle (20) to detect the presence of an adjacent vehicle (22) within a monitored zone (24, 26). A sensor module (30) includes a plurality of discrete sensor systems for monitoring unique portions of the monitored zone (24, 26), each of which comprises an emitter (52) emitting a fixed frequency modulated beam (58) of light energy (54) with a predetermined burst length into its unique portion of the monitored zone (24, 26), and a receiver (68) having a field of view (62), substantially aligned with emitted beam (58) to produce a fixed optical overlap area (A), and for sensing light energy (66) and generating a received signal. A frequency generator (48) produces two or more predetermined different fixed frequencies for use by the emitter (52) to emit beams (58) at each frequency. A phase shifter (70) produces a phase shifted reference signal with a different predetermined phase delay relationship to each fixed frequency. A mixer (72) mixes each received signal and each phase shifted reference signal to produce demodulation signals from for each frequency. A processor (40) receives and processes accoupled logic level detection signals generated by a limiter amplifier (76) for each discrete sensor system at each of the fixed frequencies to determine the presence of a vehicle (22) in the monitored zone (24, 26). The fixed frequency and the predetermined phase delay are chosen to produce a null received signal resulting from reflections of the emitted beam from uniformly distributed atmospheric backscatter within the optical overlap area (A).

10 Claims, 7 Drawing Sheets

FIG 5
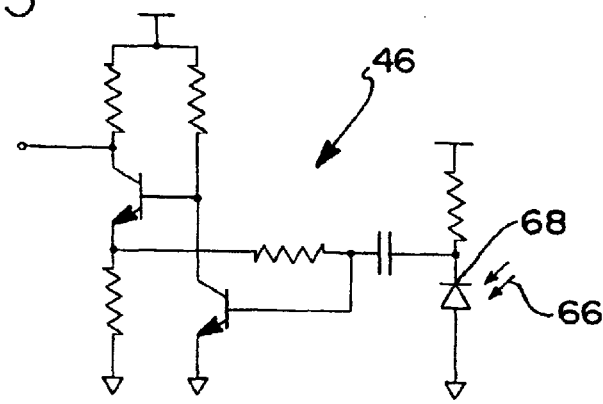
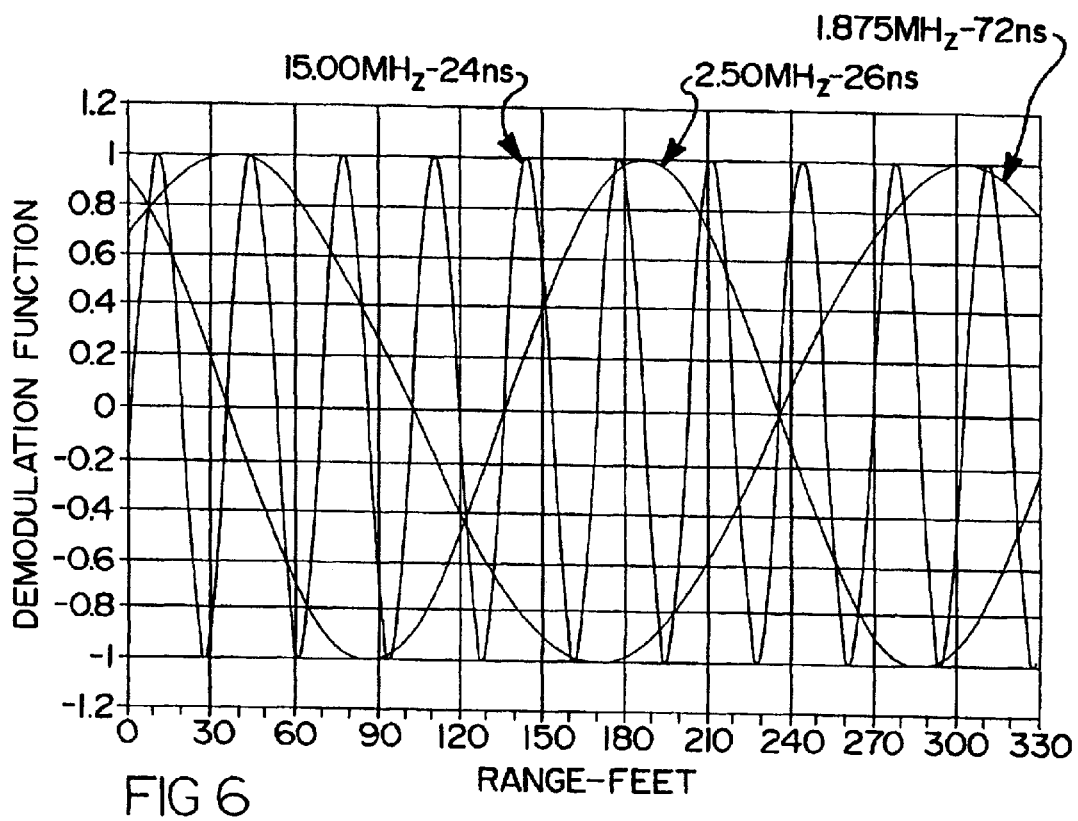
FIG 6

MULTI FREQUENCY PHOTOELECTRIC DETECTION SYSTEM

This application is 371 of PCT/US98/15053 filed Jul. 22, 1998 which claims benefit Prov. No. 60/053,381 filed Jul. 22, 1997.

BACKGROUND OF THE INVENTION

This invention relates generally to detection systems for detecting the presence of an object in a monitored zone and, more particularly, to an infrared detection system using infrared signals at multiple frequencies to discriminate between light reflected from an object within the monitored zone and other light and having means to selectively vary the boundaries of the monitored zone.

In many known photoelectric synchronous detection systems, a pulsed optical beam signal is transmitted into a volume or zone of space being monitored, typically by using an LED which is activated by a square wave or low duty factor pulse generator/oscillator. An optical photodetector is aimed into the monitored zone with a field of view which includes the pulsed LED beam so that it will receive any reflection of that signal to detect the presence of an object in the monitored zone. Such a system uses triangulation to discriminate between light reflected from objects within the monitored zone and light emanating from beyond the boundaries of the monitored zone, and is shown in U.S. Pat. No. 5,463,384—Juds.

To screen out noise and signals from sources other than a reflection from an object (e.g. other electrical or optical sources), synchronous receivers are used which operate the receiver only when a reflection of the pulsed signal is expected. This blocks any response resulting from detection of light energy from other sources during intervals when no reflected pulsed signal is possible.

To reject possible detection of intrinsic random circuit noise and detector shot noise, a fixed detection threshold is imposed on the system at a level above the expected intrinsic random noise levels seen by the detection circuit. This allows the detection circuit to ignore this noise. The probability of false detection due to noise is a function of the threshold level relative to the actual noise level, the amplitude of which is generally a Gaussian distribution.

Other examples of fixed threshold photoelectric detection systems are found in U.S. Pat. No. 4,356,393—Fayfield, U.S. Pat. No. 4,851,660—Juds, U.S. Pat. No. 4,851,661—Everett, Jr., U.S. Pat. No. 4,990,895—Juds, and U.S. Pat. No. 5,122,796—Beggs et al. Although these fixed threshold synchronous detection systems have been found useful for most photoelectric sensor applications, they are not sufficiently accurate in a situation where high receiver sensitivity is desired in an operating environment where the noise level is highly inconsistent and randomly variable.

In such an environment, detector system performance is handicapped by the necessity of tailoring detection threshold levels to performing in an environment of the worst expected noise conditions to assure a satisfactory level of noise rejection. This situation exists when the detection system is used for vehicle detection in an outdoors operating environment. Such a system used to detect vehicles in a driver's blind spot will encounter a wide variation in noise resulting from ambient light conditions that range from pitch dark nighttime, to 8500 ft-cdls of sunlight reflected from a white surface, to as high as 70,000 ft-cdls of sunlight reflecting from a wet road surface. Also, such systems can be fooled by the presence of atmospheric backscatter caused, for example, by heavy fog or snow, to falsely indicate the presence of a vehicle in the blind spot. Since false detects by such systems renders them unreliable to a vehicle driver, elimination of false detects is an important goal.

In a blind spot detection system, the reflectivity of detected target vehicles will vary wildly, as will ambient lighting conditions. Thus, such a system will be required to detect vehicles that range in reflectivity from black to white, in lighting conditions that vary from pitch-dark nighttime to bright sunlight. Thus detection requirements range from a black vehicle at nighttime to a white vehicle in bright sunlight.

In the dark of night very little DC photocurrent is produced in the detectors, resulting in very little shot noise. However, operation in bright daylight will result in quite significant DC current in the receiver photodiodes, resulting in high shot noise levels. When the receiver views a white target vehicle in bright sunlight, the photocurrent generates shot noise which is many times greater than the intrinsic electronic noise of the receiver amplifier itself. To avoid false detection caused by a high level of shot noise, the required threshold must be quite large in comparison the worst case shot noise. This high threshold results in low system capability of detecting very dark, low reflective targets in all lighting conditions.

There have been several attempts to overcome the operational problems caused by this wide variation in system noise levels. These involve providing the detection system with some form of adaptive adjustment based on a measurement of the noise amplitude characteristics which are then used to set the detection threshold of the receiver. The resulting adaptive threshold receiver optimizes its sensitivity relative to the ambient measured receiver noise to maintain signal reception integrity. Examples of such systems are found in U.S. Pat. No. 3,999,083—Bumgardner, U.S. Pat. No. 4,142,116—Hardy et al, U.S. Pat. No. 4,992,675—Conner et al, and U.S. Pat. No. 5,337,251—Pastor.

Such systems are quite expensive, since they require the addition of circuitry to continually measure noise, to block such measurement and maintain the prior measurement when an actual signal is detected, and to feed measured levels back to the variable gain stage. This circuitry adds components and assembly labor, and increases system size.

Vehicle blind spot detector systems such as disclosed in the above-mentioned patents utilize both driver-side and passenger-side detectors. One system comprises sets of six emitter-detector pairs in a module, the detectors being, pairs of photodiodes of opposite polarity. The effective range of the system is determined by the geometry of these components. These components are quite small and require holding very precise tolerances during manufacturing to maintain their geometry.

It has also been proposed to provide a blind spot detector featuring a synchronous pulse detection system having an adaptive threshold that is inherently controlled by the statistical nature of the receiver noise to optimize sensitivity of the system receiver and maintain an acceptably low false detection rate. A multi-test zero threshold detector checks the combined noise and pulse response of a bandwidth-limited receiver at two or more spaced time points which are timed by pulse emission to correspond with expected maximum and minimum voltage peak and flyback responses from reflections of the emitted pulses. An up/down counter is employed to count up only if the comparator reports the correct polarity of the responses, and counts down for all other responses. The up/down counter is heavily biased to count down until the received signal is large enough relative to the noise to overcome the negative count bias and count up to produce a detect signal. In this system, the false detection rate in the absence of a valid signal decreases exponentially with the length of the counter. Such a system is disclosed in PCT/US97/20637, the disclosure of which is incorporated herein by reference.

This detector system also operates on the geometric arrangement of the emitters and photosensors. Since triangulation is used to discriminate between sensed reflections from objects within the zone and from beyond the monitored zone, precise placement of these elements is critical. Also, since three lenses are required, the unit remains bulky and must be mounted on or within the vehicle body, usually at the taillights.

Systems using triangulation require a second receiver for each emitter to be sufficiently insensitive to reflections from non-uniform objects in the monitored zone. Such double triangulation systems not only bear an added cost burden for the extra circuitry and components, but also increases the unit's physical size, which makes it unattractive to space-conscious automobile manufacturers.

There is a need for a detector system which is small and compact enough to be placed in or on the outside rearview mirrors of a vehicle. There is also a need for a detector system that does not require precise relative placement of the emitters and photodetectors, nor the use of double triangulation, thus enabling the use of fewer and less expensive components, smaller unit size, and minimized manufacturing cost. There is also a need for a detector system that incorporates built-in adjustments for selectively varying the boundaries of the monitored zone.

These prior art light energy detector systems are but one segment of photo-optical ranging technology. In another segment, a short pulse laser beam is emitted toward a distant object and the time delay of the reflection of that beam is determined. From this information, the distance of the object can be determined, such as shown in U.S. Pat. Nos. 2,234,329; 3,723,002; 4,634,272; 5,179,286; 5,699,151 and 5,724,141. Other systems measure the phase delay of reflected fixed frequency modulated light, as in U.S. Pat. Nos. 3,778,159; 3,888,588; 4,146,328; 5,194,906 and 5,239,353.

Further systems measure the frequency of an oscillator and include the optical path in the feedback loop, as illustrated in U.S. Pat. Nos. 3,649,123; 3,739,628; 3,778,160; 5,125,736 and 5,309,212. Yet other systems measure the difference frequency produced by mixing the transmission frequency with the return frequency, which is known as FM-CW or chirp modulation, as shown in U.S. Pat. Nos. 3,647,298 and 4,721,385.

These range sensing systems were mainly developed for surveying and military applications, which require precise determinations of long distances. Although such systems could find applicability for blind spot detection applications, they require equipment that is both too bulky and too expensive for commercial practicability.

However, similar systems have been proposed for automotive use. One such system has been proposed for use in vehicles to detect and track a frontal object. As shown in U.S. Pat. No. 5,461,357, a computer tracks the relative speeds of the vehicle and a detected object to judge if the object presents a hazard to the vehicle. Another system, shown in U.S. Pat. No. 5,260,682, uses the phase shift principle to determine the distance between a vehicle and an approaching object. The rate of change of this distance is used, along with the vehicle speed to determine the speed of the object. Both of these systems are exceedingly complex and prohibitively expensive. As a result, they have found no commercial applications to date.

An additional problem that such distance measurement systems must overcome is atmospheric backscatter. In an automotive setting, this backscatter takes the form of fog, snow, and road spray or mist. This problem is exacerbated by the conflicting objectives of (a) sensing a very low reflectivity car at the far boundary of the monitored zone and (b) maintaining immunity to false detections in the presence of heavy fog, mist or snow. Although reflectivity if of atmospheric backscatter is usually small when compared to a black car at the far boundary of the monitored zone, the returned signal in a photoelectric system decreases with the square of the range in the far field (beyond a few feet). Thus, the photoelectric response from an object at 3 feet is 49 times stronger than the response from an object at 21 feet. This characteristic aggravates the problem, since sensitivity to atmospheric backscatter at close range is much better than at the far boundary of the monitored zone and makes balancing these objectives virtually impossible without some form of compensation.

This problem is addressed in U.S. Pat. Nos. 5,724,141; 5,311,012; 5,354,983 and 5,418,359. However, the solutions proposed require additional components and circuitry which render them so costly as to be impracticable for automotive use.

SUMMARY OF THE INVENTION

It is an object of this invention to provide a photoelectric object detector that does not require precise relative placement of the emitters and photodetectors, thus enabling less expensive components and manufacturing.

It is another object of this invention to provide a photoelectric object detector having means for selectively varying the boundaries of the monitored zone.

It is yet another object of this invention to provide a photoelectric detector which is small and compact enough to be placed in the outside rearview mirrors of a vehicle.

It is a further object of this invention to use the phase shift principle to determine the presence of an object within the boundaries of a monitored zone.

It is a still further object of this invention to provide a detection system in which a detection signal caused by atmospheric backscatter is effectively nulled.

This invention provides a system which eliminates the need to measure the specific range of a detected object and only determines if the object is in the monitored zone. The system uses a simplified phase delay measurement architecture in which the frequencies used are chosen so that a returned signal reflected by an object in the monitored zone produces a positive demodulation signal for each of the frequencies used, eliminating the complexities of prior art systems.

It also provides a system which neutralizes the effect of atmospheric backscatter by strategically positioning the emitter-receiver field of view overlap and choosing natural detection nulls tailored to monitored zone characteristics.

In one aspect, this invention features an electro-optical detection system for detecting objects within the boundaries of a monitored zone comprising an emitter and photodetector pair, wherein the emitter emits a beam of pulses of light energy at multiple frequencies into the monitored zone, and the photodetector detects light energy including light energy from the beam that is reflected from an object within the monitored zone and generates light detection signals, and a controller for operating the emitter and photodetector pair and for generating a phase-delayed reference signal at each frequency. The controller mixes the light detection signals and the reference signals to produce a phase difference signal for each frequency that varies in polarity sinusoidally with the distance to the object, and compares the polarity of these phase difference signals to determine the presence of an object in the monitored zone.

Preferably, the detection system includes a plurality of emitter and detector pairs, each monitoring a unique portion of the monitored zone, and the controller is operable to adjust the phase of the reference signals for each to vary the effective boundaries of the monitored zone.

In yet another aspect of this invention, the controller includes a phase shifter for phase shifting the reference signal to equal the expected phase shift of an emitted signal reflected from an object at a boundary of the monitored zone, enabling the comparator to determine whether received light energy is reflected from an object within or outside said boundary.

In still another aspect of this invention, the controller includes a programmable phase shifter which generates sequential reference signals at each frequency that are phase shifted to equal the expected phase shift of corresponding light energy pulses reflected from an object and at the far boundary of the zone, thus enabling the comparator to determine whether the phase shift of received light energy is greater or lesser than the reference signal.

Preferably, the detection system is mounted on each of the vehicle's outside rearview mirrors.

In a further aspect of this invention, collision avoidance apparatus is mounted on a host vehicle to detect the presence of an adjacent vehicle within a monitored zone and has a sensor module which includes at least one discrete sensor system for monitoring a unique portion of the monitored zone. An emitter emits a fixed frequency modulated beam of light energy with a predetermined burst length into the unique portion of the monitored zone, and a receiver which has a field of view substantially aligned with the emitted beam, senses light energy and generates a received signal. A frequency generator produces at least one fixed frequency, a phase shifter produces a phase shifted reference signal with a predetermined phase delay relationship to said fixed frequency, and a mixer produces demodulation signals from each received signal and each phase shifted reference signal. The radiation pattern of the emitted beam and the field of view of the receiver have a fixed optical overlap area, and the fixed frequency and the predetermined phase delay are chosen to substantially produce a null received signal resulting from reflections of the emitted beam from uniformly distributed atmospheric backscatter within the optical overlap area.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 5 is a schematic diagram of the receiver circuit of the system of FIG. 3;

FIG. 6 is a chart plotting three frequency demodulation functions versus range, illustrating that only a single zone exhibits a positive demodulation response at all frequencies;

DETAILED DESCRIPTION OF A PREFERRED EMBODIMENT

Figure 1:
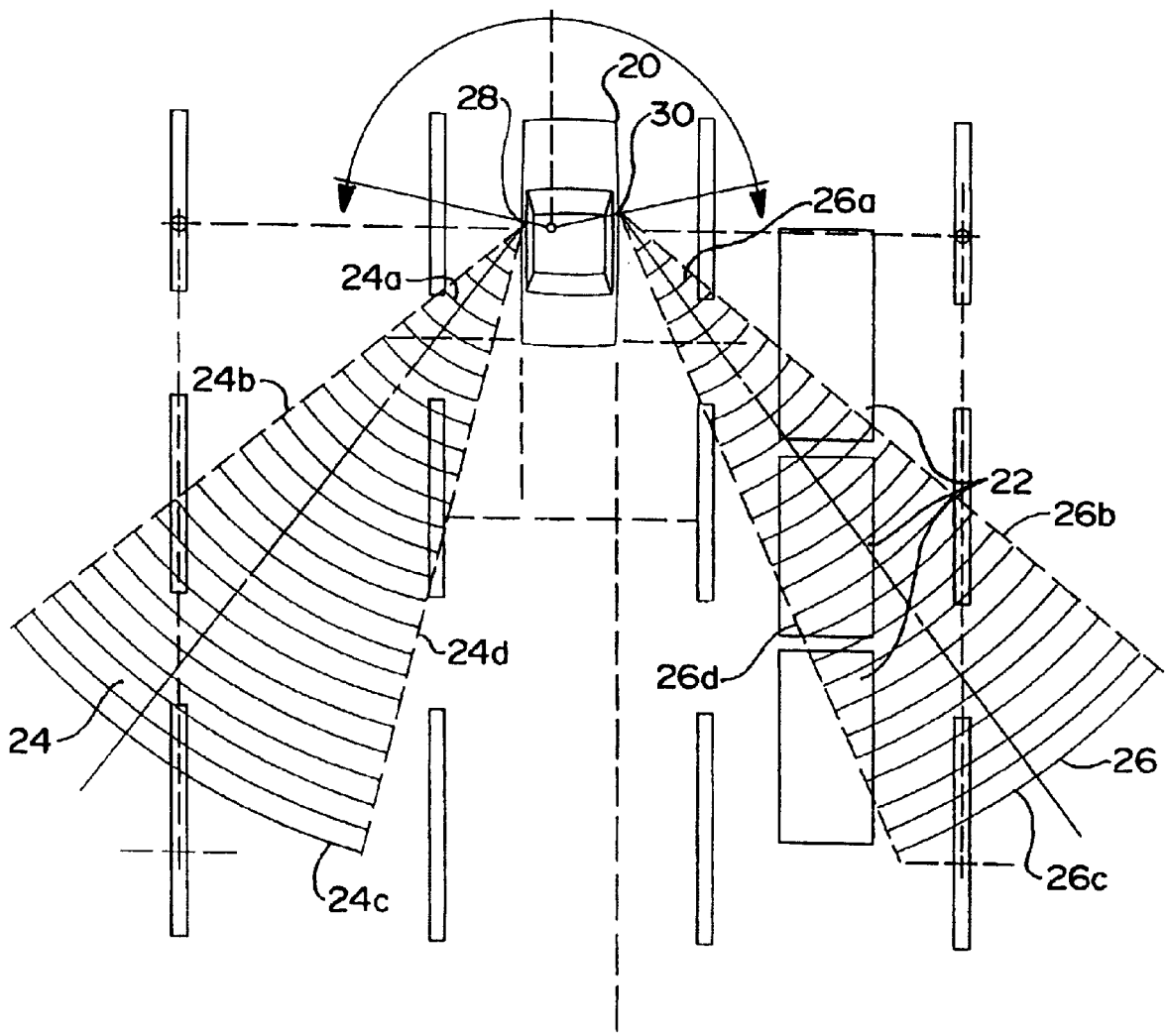
FIG. 1 is a schematic view of a vehicle employing a detection system according to this invention, illustrating the monitored zones in the blind spots adjacent the vehicle.
Figure 2:
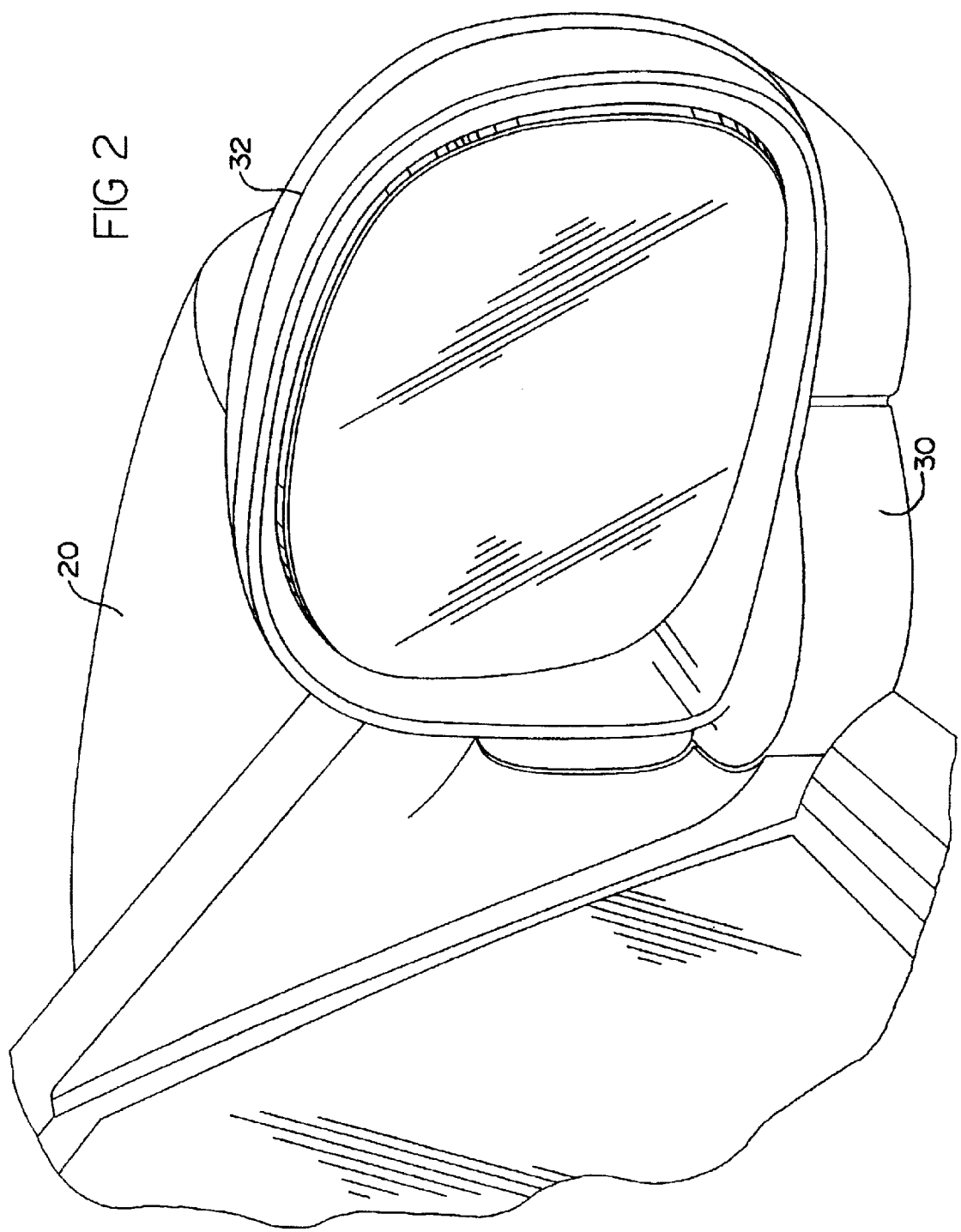
FIG. 2 is a perspective view of a passenger-side outside rearview mirror incorporating a detection system according to this invention.

The detection system illustrated and described herein is a vehicle blind spot detector of the type disclosed in PCT/US97/20637. It functions to provide information to the driver of a host vehicle 20 regarding the presence of one or more vehicles 22 in adjacent zones 24 and 26 that are monitored by detection systems or units 28 and 30 having boundaries 24*a, b, c, d* and 26*a, b, c, d*, as shown in FIG. 1. These monitored zones 24 and 26 comprise the so-called "blind spots" or areas which the driver of vehicle 20 cannot see directly or through the inside and outside rearview mirrors. The emitter and detector units of detection systems 28, 30 are preferably mounted in or on the vehicle's outside rearview mirrors, one of which (32) is illustrated in FIG. 2 as mounting detection system unit 30.

Figure 3:
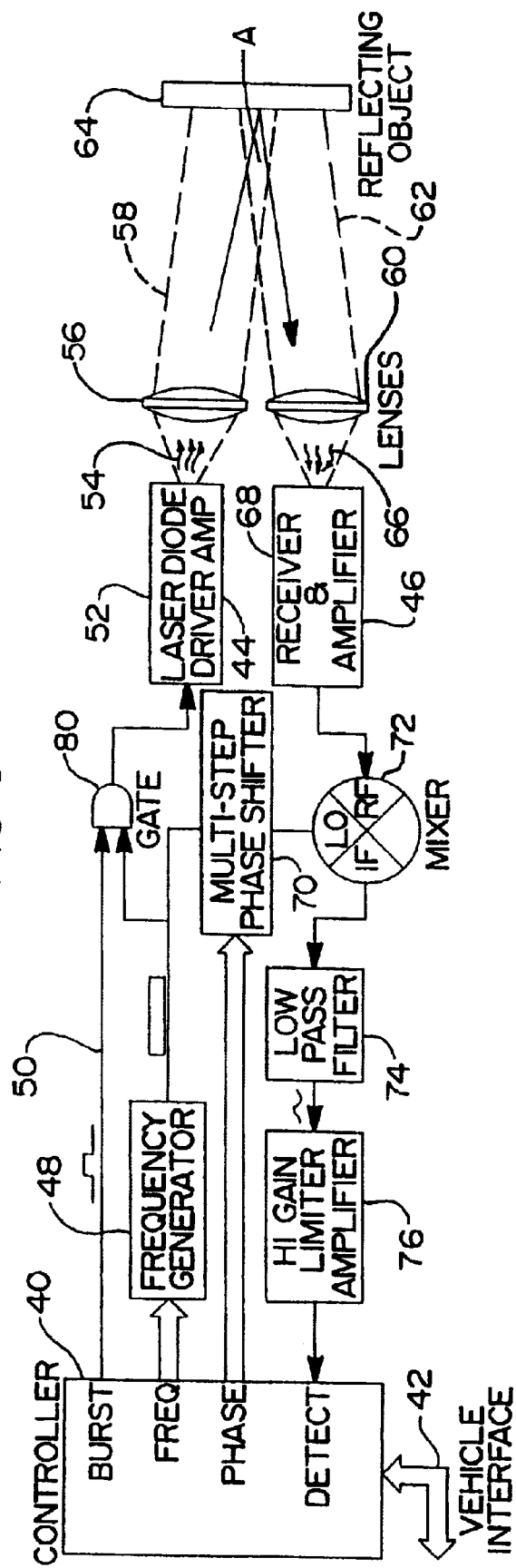
FIG. 3 is a schematic circuit diagram of a multiple frequency detection system according to this invention.

The circuit of the detection system of this invention is shown schematically in FIG. 3 as comprising a microcontroller 40 which is connected to vehicle systems through an interface 42. Microcontroller 40 orchestrates various system control and timing logic, and interfaces with vehicle 20 to receive power and sensor activation requests and to transmit sensor detection and condition status. Although the detection system includes six infrared sensor beams that are multiplexed by means well-known in the art by fanning out just before the laser diode drive amplifier 44 and fanning in just before the receiver amplifier 46, the simplified diagram of FIG. 3 represents all pertinent functions of this system.

As shown in FIG. 6, the system operates at three different frequencies each having an offset phase (15 MHz with an offset of −24 ns, 2.5 MHz with an offset of +26 ns, and 1.875 MHz with an offset of −72 ns). In this blind spot application, a monitored zone of approximately 4–20 ft is desired in order to adequately cover the driver-side and passenger-side blind spots as measured from the outside rearview mirrors. 15 MHz was chosen as the primary frequency for the following reasons.

15 MHz has a period of 66.67 ns. A returned signal is mixed with a phase controlled reference signal of the same frequency that is set to be 90° out of phase with the returned signal at a monitored zone boundary range. This will produce a zero output from the mixer because the signals are in phase quadrature. A returned signal at a closer range will produce a + signal, while a − signal is produced at farther ranges, because the returned light signal is phase shifter by 1.97 ns/ft of range change of the detected object, which is 10.7° of phase shift at 15 MHz. The maximum signal is produced at multiples of 180° of phase shift, and nulls are produced at 90° of phase shift. Thus, a system with a null at 22 ft will also have a null at $$22\,\text{ft} - \frac{180}{360} \frac{66.67\,\text{ns}}{1.97\,\text{ns/ft}} = 5.08\,\text{ft}$$

This system will thus produce a positive detection in the range of 5.08 ft–22 ft, negative detection at 22 ft–38.92 ft, positive detection at 38.92 ft–55.84 ft, etc., switching polarity every 16.92 ft which produces an alias uncertainty. We employ two additional frequencies to resolve the alias problem. Here, 2.5 MHz and 1.875 MHz frequencies are chosen such that a positive response from return signals at all three frequencies are required to place the detected object in the monitored zone.

Microcontroller 40 cycles among these three frequencies for each of the six emitter-detector pairs to determine the presence of a vehicle in the monitored zone. Microcontroller 40 selects one of the three frequencies and sends the proper control bits to a frequency generator 48, which produces the requested frequency. At a predetermined time, microcontroller 40 issues a BURST signal 50, typically 40 $\mu$s in duration, which is used to gate the frequency to amplifier 44, which, in turn, drives laser diode 52 with typical peak currents of 1 amp. Burst sequence can comprise sequentially exercising each diode at one frequency, then shifting to the next frequency; or, the sequence could comprise sequentially exercising each diode at all three frequencies, then shifting to the next diode.

The burst of modulated infrared light 54 emitted by laser diode 52 is collected and collimated by emitter lens 56, producing a beam 58 which is projected into a unique portion of monitored zone 26 (FIG. 1). A receiver lens 60 has a field of view 62 that overlaps emitted beam 58 in an area A, so that any reflection 66 thereof from an object 62 is collected and focused onto a receiver photodiode 68, where the light is converted into an electric current that is sent to amplifier 46.

When frequency generator 48 develops the preselected frequency, it simultaneously sends the frequency to a multi-step phase shifter 70, which provides a phase-shifted reference signal to the LO port of a mixer 72, where it is mixed with the received signal supplied to the RF port and demodulated. The amount of phase shift applied by phase shifter 70 is set by controller 40 according to the boundary range versus polarity of response desired for the particular frequency. Mixer 68 performs a multiplicative function between the received signal on the RF port and the phase-shifted version of the same frequency on the LO port.

The demodulated IF port output is determined by the following equation:

$$\text{IF Output} = K_m\{\text{SIN}(2f\pi(t-\tau))[A_R\text{SIN}(2\pi f(t-2d))]\},$$

and the low pass filtered IF output is given by the following equation:

$$\text{LPF Output} = K_m A_R \text{COS}(2\pi f(2d-\tau)),$$

Where:
$K_m$=conversion gain of mixer 72,
$A_R$=receiver amplifier 46 signal amplitude,
f=operating frequency in GHz,
t=time in ns (nanoseconds)
$\tau$=time delay of phase shifter 70 in ns
d=distance to object in feet The use of distance d as 1.0 ft/ns in the above equations is a close approximation the travel speed of light which, is actually 0.984 ft/ns.

Thus, when the receiver delay, including propagation delay to the object and back, is equal to the phase shift, the response is maximum because the argument of the COS function ($2\pi f(2d-\tau)$) is zero. In FIG. 6, the 15 MHz waveform is delayed by 24 ns, which corresponds to peak response at 12 ft., where the propagation delay for the light (out and back) is 24 ns. It is apparent that a null will occur whenever the COS function argument is an odd multiple of 90° ($\pi/2$ radians). Since 15 MHz has a period of 66.67 ns, a 90° phase shift equates to 16.67 ns and produces a null at ±8.33 ft from the aforementioned peak response at a range of 12 ft. This corresponds to the nulls illustrated in FIG. 6 at approximately the 4 ft and 20 ft range marks. Similarly, when the COS argument is an even multiple of 180°, the output response will be at a negative peak.

In the aforementioned prior art range detection devices, it is necessary to resolve the exact phase angle of the returned signal to determine the exact range of the detected object. This is usually accomplished by using two mixers, both having the same connection to the RF port, but one having an additional 90° of phase shift for its LO port signal. The two IF port outputs are then low pass filtered and digitized. From this, an arctan computation can be made to produce the phase angle. This invention eliminates such complexity and concomitant expense by using only one mixer, eliminating the analog-to-digital converter, and simply detecting the presence or absence of a positive output. The mixed signal is sent through a low pass filter 74 and a high gain limiter amplifier 76 for a detection determination by microcontroller 40. This will indicate whether the detected object is inside or outside the monitored zone, and operates simply as a "go-no go" detector.

Figure 11:
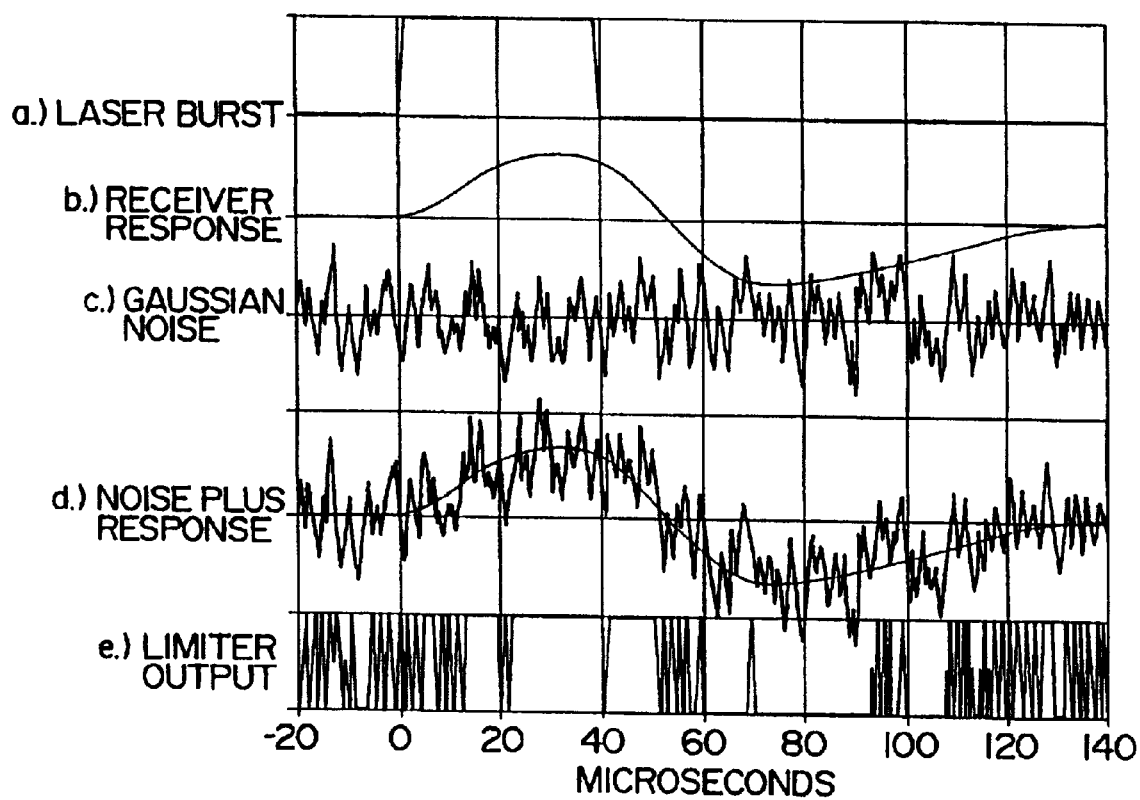
FIG. 11 is a chart showing the effect of noise on system pulse responses.

Extremely sensitive detection of a positive received signal is accomplished by transmitting a burst of light (40 $\mu$s) and then determining the envelope of this burst on receiver amplifier 76 as depicted in FIG. 11. The principle of detection resides in statistical sampling of the response near the end of the emitted burst and, again, after about 30 $\mu$s after the end of the burst for the flyback response. This technique is more fully set forth in PCT/US97/20637. Of the four possible states that can result from the sample, the detection algorithm will count down for Lo—Lo, Lo-Hi and Hi—Hi responses, and count up only for a Hi-Lo response. This technique biases the count 3:1 toward counting down in the presence of random noise, and only continually count up in the presence of a substantial return signal. The counter count is limited by a zero floor and a +15 threshold which will yield an object detection by microcontroller 40 which will continue until the count returns to zero. As PCT/US97/20637 shows, this algorithm results in an effective threshold of about 60% of the RMS noise level and has a negligible false alarm rate of about 5E-8.

By using this simple single mixer method, the information provided is only whether the object is at a range corresponding to one of the positive half cycles, but not which one. This produces the well-known ambiguity or alias problem encountered by all ranging devices of this general type.

Here, multiple frequencies (2.50 MHz and 1.875 MHz) are used to determine if the object is in the 15 MHz positive half cycle corresponding to the monitored zone. As shown in FIG. 6, the use of these frequencies produces only one zone (approximately 4–20 ft) where all three frequencies produce a positive response upon detection of an object. A positive response would also occur at all three frequencies at a range over 350 ft, but any return signal from even a very strong reflector would be too weak to detect, thus eliminating the need to consider such signals. The frequencies and phase shifts or offsets were carefully chosen to achieve this exclusionary result over an entire range in which a sufficiently strong signal can be returned.

Figure 7:
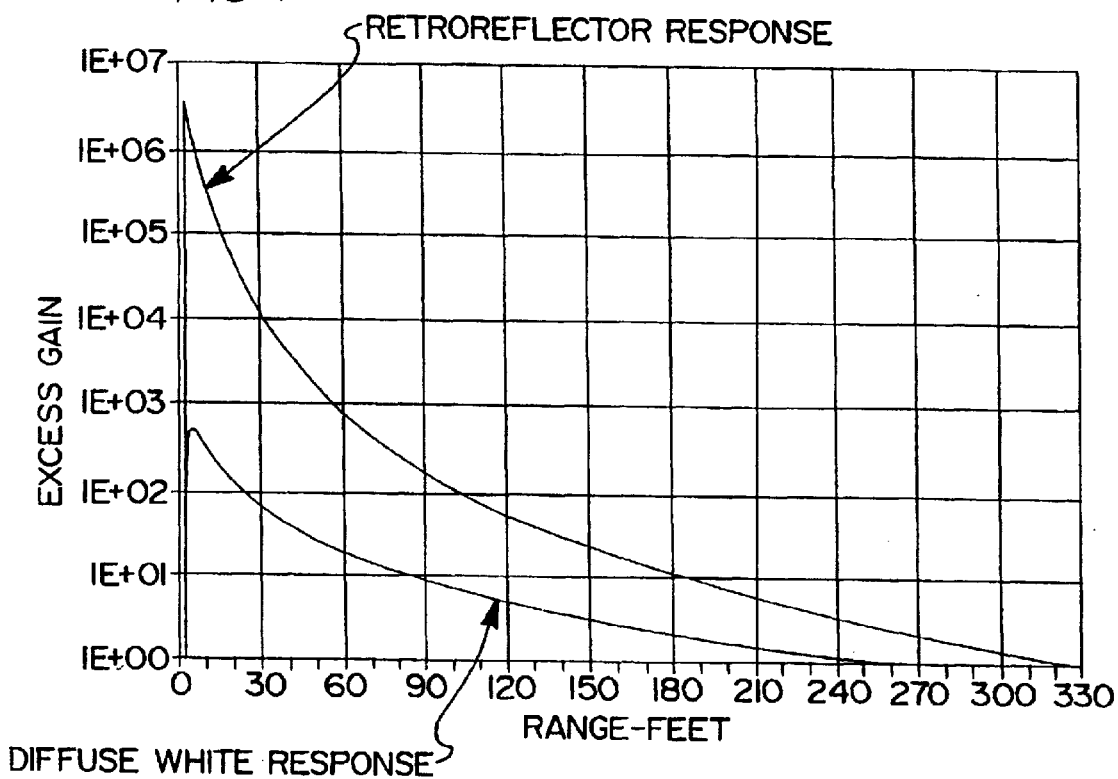
FIG. 7 is a chart plotting photoelectric excess gain as a function of range for a fixed diameter retroreflective reflective target and an extended diffuse white target, illustrating the effect of field of view overlap.
Figure 8:
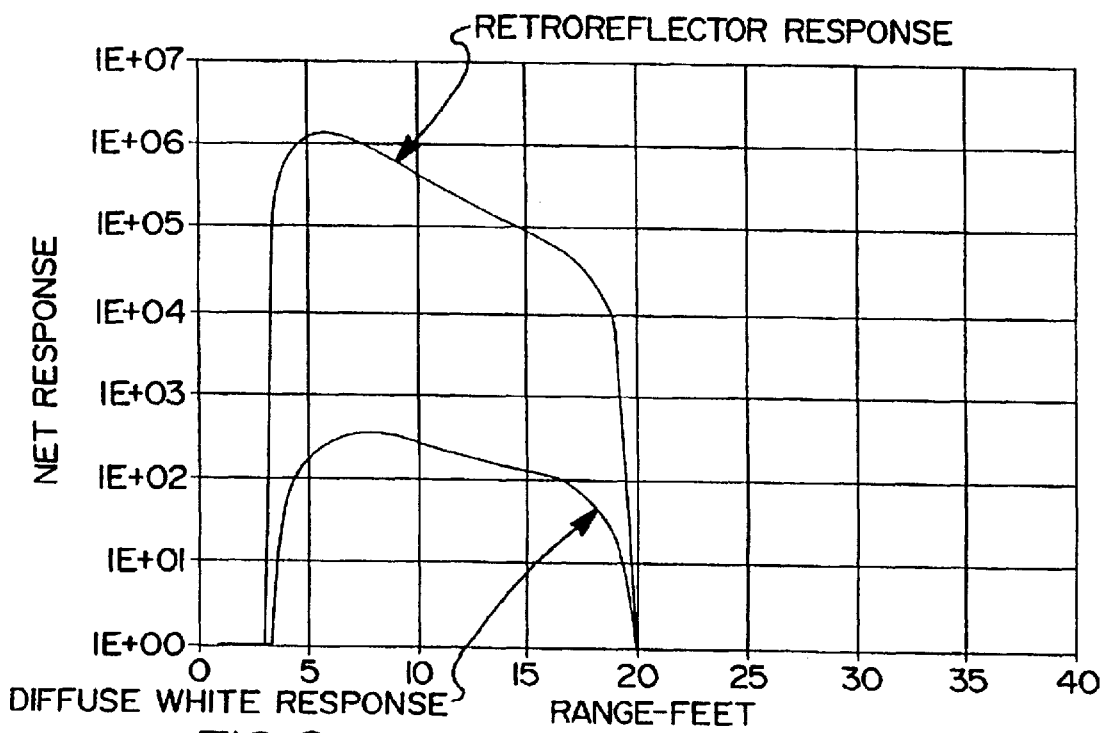
FIG. 8 is a chart showing net system response function, inclusive of three frequency AND function and photoelectric response function, illustrating net response as a function of range.

FIG. 7 shows the photoelectric response function for both a fixed size retroreflector common to roadsides and car fenders, and for an extended diffuse white reflecting object such as the side of a painted building. The vertical scale represents signal level in excess of detection threshold. Note that the return signal from the diffuse white diminishes with the square of the distance. Although the retroreflector return signal is much stronger at short ranges, it diminishes with the fourth power of distance. Because FIG. 7 indicates possible detection to beyond 300 ft, the frequencies and phase offsets must be carefully chosen to ensure that any aliases under this range are excluded. Use of the example three frequencies, the beam overlap function and the photoelectric response produces the net system response function shown in FIG. 8, with positive responses only in the 4–20 ft range, and no alias zones at greater distances where return signals are detectable.

Thus, this invention eliminates the need to generate both the SIN and COS mixer products and further eliminates the need to perform analog-to-digital conversions on each of them. It provides a simple presence/absence ("go-no go") detection system that reliably indicates object presence within the 180° phase zone that produces a positive mixer demodulation product. By carefully tailoring frequencies and phase offsets, similar results can be accomplished for other monitored zone ranges.

The problem associated with false detects caused by atmospheric backscatter (fog, mist, rain, snow, splash) is is minimized by careful choice of the overlap function of the emitter beam pattern and the detector field of view, and choice of where the near zone null in the demodulation function is located. Atmospheric backscatter is reasonably modeled by determining a fixed percentage of reflectivity per foot of depth. For example, for a light fog that reflects 0.001% per foot, the total signal returned from this fog to the receiver would be the sum, for each foot of range, of the demodulation function of FIG. 6, multiplied by the photoelectric response from FIG. 7, multiplied by 0.001%.

FIG. 7 shows the basic photoelectric response including the overlap function of the receiver field of view with the emitter radiation pattern and including the inverse square relationship with distance for a diffuse white object. There is a sharp rise at about 3 ft where overlap begins. If overlap began closer the curve for the diffuse white target would soar to a peak as high as 200,000 (2e+5) at 0.5 ft. This incredibly high sensitivity would be indeed problematic for even the lightest atmospheric backscatter. The distance of beginning of beam overlap is determined by the spacing of emitter lens 56 from receiver lens 60, the angular divergence of the beam and field of view, and their directional aiming. These parameters are controllable by the system designer.

Figure 9:
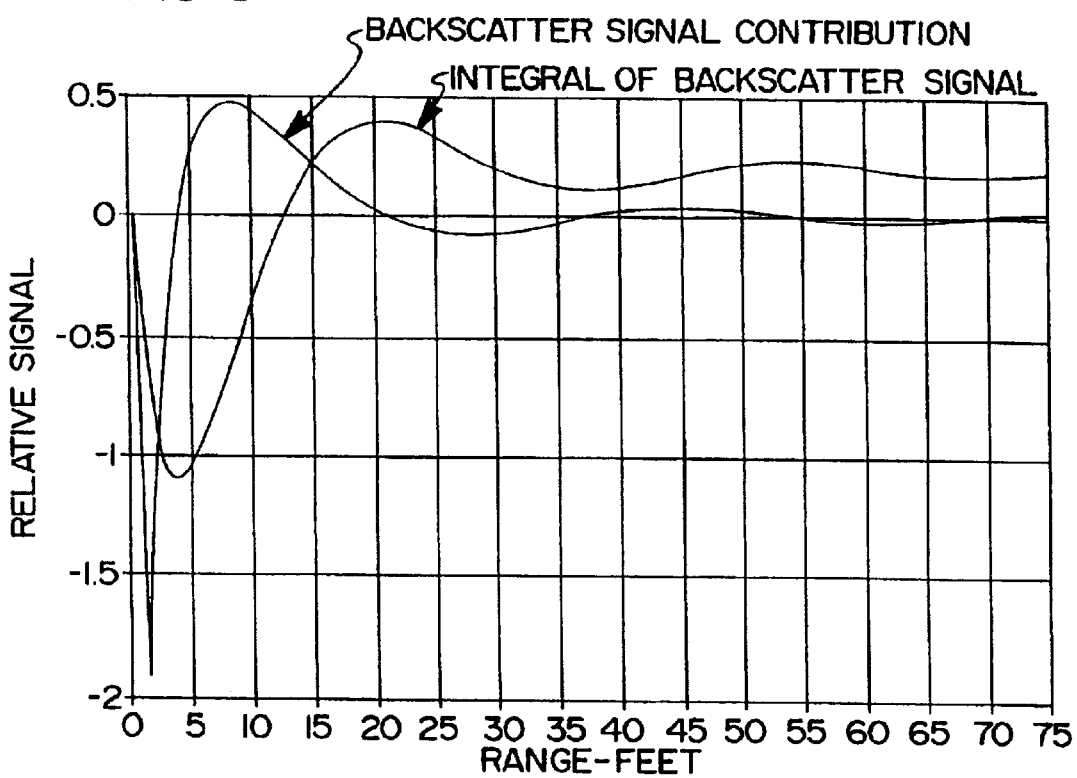
FIG. 9 is a chart showing an example integration function for a 15 Mhz modulated signal with a near null of 4 ft. (1.22 m) and a lens separation of 0.2" (6 mm)

Referring again to FIG. 6, the near null is at a range of approximately 4 ft on the 15 MHz curve. Positioning this null at a greater distance than the overlap point will produce some compensating negative signal contribution to offset the positive signal contribution at farther ranges. FIG. 9 shows the relative backscatter contribution and the integration of that signal over the range of 0–75 ft. It is desirable to sum all the contributions out to very large distances to a sum near zero, thus obtaining an intrinsic self-cancellation of the backscatter signal contributors to a first order approximation. It is apparent that the amount of negative signal contribution at close range is essential to achieve this goal. It is important to have a balance, because a too-large positive contribution could produce a false detection, while a too-large negative contribution could suppress sensitivity to very black vehicles.

Figure 10:
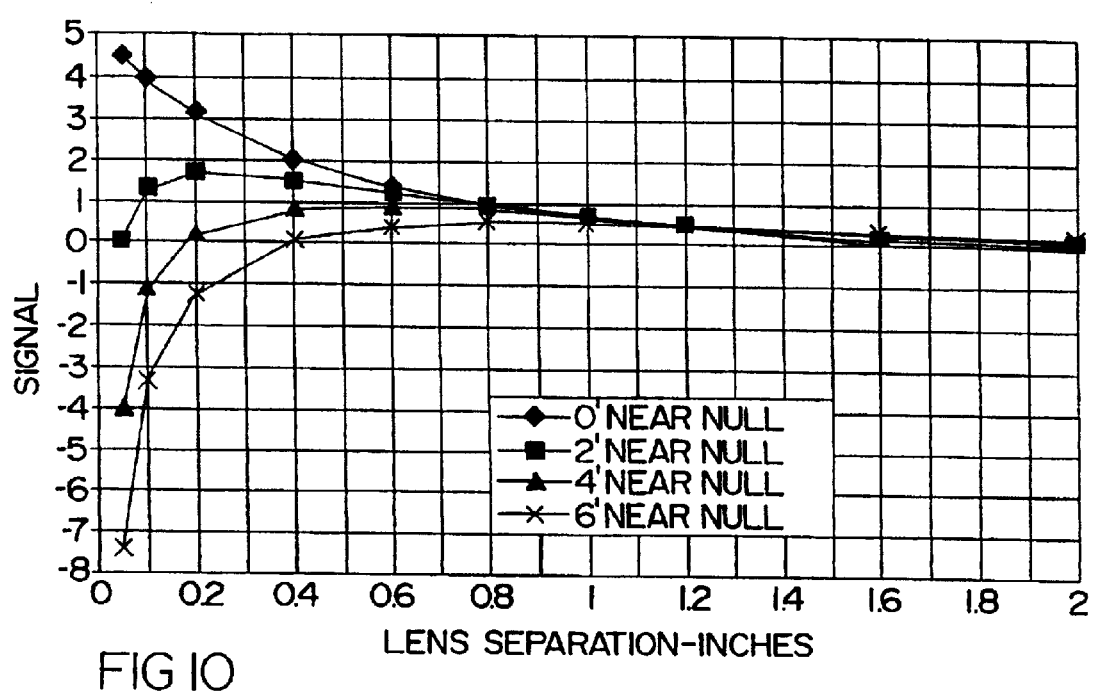
FIG. 10 is chart showing a detect signal resulting from atmospheric backscatter at 15 Mhz modulation for backscatter reflectivity of 0.05%/ft. relative to a standard white diffuse reflector.

FIG. 6 depicts the effects of changing lens separation with a predetermined near null position for 15 MHz. When the demodulator null is positioned at zero range, there is no near zone negative contribution. Increasing lens separation improves the situation to point where it seems that greater separation is better. However, a 1-inch separation creates a "dead" (nondetect) zone out to 4 ft, while a 2-inch separation creates a "dead" zone out to 8 ft, which would be excessive in an automotive blind spot application. The vertical scale in FIG. 10 is calibrated to be relative to the detection threshold of the sensor. Thus, an ideal system would have integrated backscatter near zero, in any case less than 1 for the level of atmospheric backscatter tolerance desired. A balanced choice indicated by FIG. 10 would be a 0.2 in lens separation with the demodulator near zone null set at 4 ft.

Figure 4:
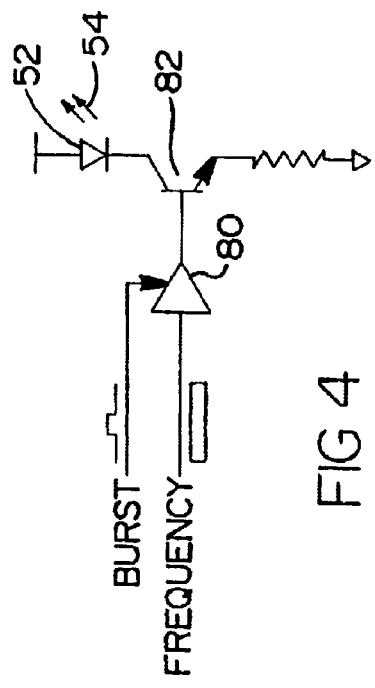
FIG. 4 is schematic diagram of the laser diode drive circuit of the System of FIG. 2.

Detailed circuitry is shown schematically in FIGS. 4 and 5. In FIG. 4, a preferred embodiment of the emitter circuit has a common 74F series bus driver gate 80, which has sufficient current drive capability and is fast. It drives a Zetex FMMT491A high beta, high current NPN transistor 82, which controls current through a Siemens SFH495 laser diode emitter 52.

In FIG. 5, received light is received through lens 60 by a Siemens SFH302 high-speed PIN photodiode receiver 68, which converts light into an electric current. Transimpedence amplifier 46 has a gain of 10K ohms, a bandwidth of 27 Mhz and an equivalent input noise of 4 pA/Hz using low noise metal film resistors. Low noise performance is necessary to achieve maximum sensitivity for detection of extremely dark vehicles at the far boundary of the monitored zone. Noise performance need not be any better than the noise current produced as shot noise from the presence of ambient light.

Thus, this invention overcomes the limitations of the prior art to provide an object detection system that simply uses a comparison of the polarity of phase difference signals resulting from mixing detection signals at multiple frequencies with a phase delayed reference signal at each frequency to determine whether a detected object is located in a monitored zone. This eliminates the need to measure the exact range of the object, and the need for high precision geometry and assembly required for triangulation-based systems. The effect of atmospheric backscatter on reliable detection is minimized by the choice of optical overlap, frequencies and phase delays chosen. While only a preferred embodiment has been illustrated and described, obvious modifications thereof are contemplated within the scope of this invention as defined by the following claims.

What is claimed is:

1. An electro-optical detection system for detecting objects within the boundaries of a monitored zone, comprising an emitter and photodetector pair, wherein the emitter emits a beam of pulses of light energy into the monitored zone, and the photodetector detects light energy including light energy from the beam that is reflected from an object within the monitored zone and generates light detection signals, and a controller for operating the emitter and photodetector pair and for generating an object detection signal when it determines that an object is in the monitored zone, characterized by the emitter emitting a beam of pulses of light energy at multiple frequencies into the monitored zone, and the controller generating a phase-delayed reference signal at each frequency, mixing the light detection signals and the reference signals to produce a phase difference signal for each frequency that varies in polarity sinusoidally with the distance to the object, and comparing the polarity of these phase difference signals to determine the presence of an object in the monitored zone.

2. The detection system of claim 1, further characterized by including a plurality of emitter and photodetector pairs, each monitoring a unique portion of the monitored zone.

3. The detection system of claim 2, further characterized by the controller being operable to adjust the phase delay of the reference signals for each to vary the effective boundaries of the monitored zone.

4. The detection system of claim 3, further characterized by the controller including a device for phase shifting the reference signal to equal the expected phase shift of an emitted signal reflected from an object at a boundary of the monitored zone, thereby enabling the comparator to determine whether received light energy is reflected from an object within or outside said boundary.

5. The detection system of claim 1, further characterized by the emitters and photodetectors being mounted on an outside rearview mirror of the vehicle.

6. Collision avoidance apparatus mounted on a host vehicle to detect the presence of an adjacent vehicle within a monitored zone, comprising a sensor module which includes at least one discrete sensor system for monitoring a unique portion of the monitored zone, comprising an emitter for emitting a fixed frequency modulated beam of light energy with a predetermined burst length into the unique portion of the monitored zone, and a receiver which has a field of view substantially aligned with the emitted beam and for sensing light energy and generating a received to signal, characterized by a frequency generator for producing two or more predetermined different fixed frequencies for use by the emitter to emit beams at each of said frequencies, a phase shifter for producing a phase shifted reference signal with a different predetermined phase delay relationship to each of said fixed frequencies, a mixer for producing demodulation signals from each received signal and each phase shifted reference signal for each frequency, a limiter amplifier for producing highly amplified ac coupled digital logic level detection signals from said demodulation signals, and a processor for receiving and processing said logic level detection signals generated by each discrete sensor system at each of the fixed frequencies to determine the presence of a vehicle in the monitored zone.

7. The collision avoidance apparatus of claim 6, further characterized by the apparatus comprising six discrete sensor systems.

8. The collision avoidance apparatus of claim 6, further characterized by the frequency generating means producing three fixed frequencies for use by each emitter.

9. The collision avoidance apparatus of claim 8, further characterized by the frequencies being approximately 15 MHz, 2.5 MHz and 1.875 MHz.

10. Collision avoidance apparatus mounted on a host vehicle to detect the presence of an adjacent vehicle within a monitored zone, comprising a sensor module which includes at least one discrete sensor system for monitoring a unique portion of the monitored zone, comprising an emitter for emitting a fixed frequency modulated beam of light energy with a predetermined burst length into the unique portion of the monitored zone, and a receiver which has a field of view substantially aligned with the emitted beam and for sensing light energy and generating a received signal, characterized by a frequency generator for producing at least one fixed frequency, a phase shifter for producing a phase shifted reference signal with a predetermined phase delay relationship to said fixed frequency, a mixer for producing demodulation signals from each received signal and each phase shifted reference signal, wherein the radiation pattern of the emitted beam and the field of view of the receiver have a fixed optical overlap area, and the fixed frequency and the predetermined phase delay are chosen to substantially produce a null received signal resulting from reflections of the emitted beam from uniformly distributed atmospheric backscatter within the optical overlap area.

* * * * *